(12) United States Patent
Zamani et al.

(10) Patent No.: US 9,300,407 B2
(45) Date of Patent: Mar. 29, 2016

(54) CHANNEL ESTIMATION FOR OPTICAL ORTHOGONAL FREQUENCY DIVISION MULTIPLEXING SYSTEMS

(71) Applicant: Futurewei Technologies, Inc., Plano, TX (US)

(72) Inventors: Mahdi Zamani, Ottawa (CA); Zhuhong Zhang, Ottawa (CA); Chuandong Li, Ottawa (CA)

(73) Assignee: Futurewei Technologies, Inc., Plano, TX (US)

(*) Notice: Subject to any disclaimer, the term of this patent is extended or adjusted under 35 U.S.C. 154(b) by 35 days.

(21) Appl. No.: 14/012,737

(22) Filed: Aug. 28, 2013

(65) Prior Publication Data

US 2014/0072307 A1 Mar. 13, 2014

Related U.S. Application Data

(60) Provisional application No. 61/698,128, filed on Sep. 7, 2012.

(51) Int. Cl.
*H04B 10/61* (2013.01)
*H04L 25/02* (2006.01)
*H04L 27/26* (2006.01)

(52) U.S. Cl.
CPC ............ *H04B 10/616* (2013.01); *H04L 25/025* (2013.01); *H04L 25/0236* (2013.01); *H04L 27/2647* (2013.01); *H04L 27/2649* (2013.01); *H04L 27/2697* (2013.01)

(58) Field of Classification Search
None
See application file for complete search history.

(56) References Cited

U.S. PATENT DOCUMENTS

| | | | | |
|---|---|---|---|---|
| 8,285,148 B2* | 10/2012 | Haunstein et al. | ............ | 398/193 |
| 2004/0264561 A1* | 12/2004 | Alexander et al. | ............ | 375/232 |
| 2008/0084943 A1* | 4/2008 | Jung | ...................... | H04L 5/023 |
| | | | | 375/260 |
| 2011/0310951 A1* | 12/2011 | Cvijetic et al. | ................ | 375/233 |

(Continued)

FOREIGN PATENT DOCUMENTS

| | | | |
|---|---|---|---|
| CN | 101741804 A | * | 6/2010 |
| CN | 101800714 A | | 8/2010 |
| CN | 102255667 A | | 11/2011 |

OTHER PUBLICATIONS

Liu, et al., "448-Gb/s Reduced-Guard-Interval CO-OFDM Transmission Over 2000 km of Ultra-Large-Area Fiber and Five 80-GHz-Grid ROADMs," Journal of Lightwave Technology, vol. 29, No. 4, Feb. 15, 2011, pp. 483-490.

(Continued)

*Primary Examiner* — Shi K Li
*Assistant Examiner* — Mina Shalaby
(74) *Attorney, Agent, or Firm* — Conley Rose, P.C.; Grant Rodolph; Jonathan K. Polk (57) ABSTRACT

An apparatus comprising an optical receiver configured to receive a plurality of orthogonal frequency-division-multiplexed (OFDM) symbols comprising a first OFDM symbol and a second OFDM symbol, and a processor coupled to the optical receiver and configured to generate a first decoded signal based on the first OFDM symbol, estimate a plurality of channel parameters adaptively based on the first decoded signal, generate a second decoded signal based on the second OFDM symbol, wherein the second decoded signal is generated using the plurality of channel parameters, and wherein phase recovery is performed on the first OFDM symbol using a number of pilot subcarriers prior to generating the first decoded signal.

20 Claims, 7 Drawing Sheets

(56) References Cited

U.S. PATENT DOCUMENTS

2012/0140683 A1* 6/2012 Xu .................. H04W 84/12
370/280
2014/0199073 A1* 7/2014 Yu .................................. 398/76

OTHER PUBLICATIONS

Liu, et al., "Intra-Symbol Frequency-Domain Averaging Based Channel Estimation for Coherent Optical OFDM," Optics Express, vol. 16, No. 26, Dec. 22, 2008, pp. 21944-21957.

Yi, et al., "Phase Estimation for Coherent Optical OFDM," IEEE Photonics Technology Letters, vol. 19, No. 12, Jun. 15, 2007, pp. 919-921.

Mousa-Pasandi, et al., "Data-Aided Adaptive Weighted Channel Equalizer for Coherent Optical OFDM," Optics Express, vol. 18, No. 4, Feb. 15, 2010, pp. 3919-3927.

Chen, et al., "Zero-Guard-Interval Coherent Optical OFDM wit Overlapped Fequency-Domain CD and PMD Equalization," Optics Express, vol. 19, No. 8, Apr. 11, 2011, pp. 7451-7467.

Shieh, et al., "Coherent Optical OFDM: Theory and Design," Optics Express, vol. 16, No. 2, Jan. 21, 2008, pp. 841-859.

Lowery, et al., "Calculation of Power Limit Due to Fiber Nonlinearity in Optical OFDM Systems," Optics Express, vol. 15, No. 20, Oct. 1, 2007, pp. 13282-13287.

Jansen, et al., "Optical OFDM, a Hype or is it for Real?," European Conference on Optical Communication 2008, Brussels Expo, vol. 1, pp. 49-52.

Zhuge, et al., "Dispersion-Enhanced Phase Noise Effects on Reduced-Guard-Interval CO-OFDM Transmission," Optics Express, vol. 19, No. 5, Feb. 28, 2011, pp. 4472-4484.

Lin, et al., "Phase Nose Suppression of Optical OFDM Signals in 60-GHz RoF Transmission System," Optics Express, vol. 19, No. 11, May 23, 2011, pp. 10423-10428.

Tolmachev, et al., "Filter-Bank Based Efficient Transmission of Reduced-Guard-Interval OFDM," Optics Express, vol. 19, No. 26, Dec. 12, 2011; pp. B370-B384.

Shieh, et al.,"Coherent Optical Orthogonal Frequency Division Multiplexing," Electronics Letters, vol. 42, No. 10, May 11, 2006, 2 pages.

Djordjevic, et al., "Orthogonal Frequency Division Multiplexing for High-Speed Optical Transmission," Optics Express, vol. 14, No. 9, May 1, 2006, pp. 3767-3775.

Du, et al., "No-Guard-Interval Coherent Optical OFDM with Self-Tuning Receiver," Optics Express, vol. 19, No. 3, Jan. 31, 2011, pp. 2181-2186.

Jansen, et al., "20-Gb/s OFDM Transmission over 4,160-km SSMF Enabled by RF-Pilot Tone Phase Noise Compensation," Fiber Optics Communications, 2007, 3 pages.

Shieh, et al., "Theoretical and Experimental Study on PMD-Supported Transmission Using Polarization Diversity in Coherent Optical OFDM Systems," Optics Express, vol. 15, No. 16, Aug. 6, 2007, pp. 9936-9947.

Schmogrow, et al., "Real-Time OFDM Transmitter Beyond 100 Gbit/s," Optics Express, vol. 19, No. 13, Jun. 20, 2011, pp. 12740-12749.

Foreign Communication From a Counterpart Application, PCT Application No. PCT/CN2013/083133, International Search Report dated Dec. 13, 2013, 7 pages.

Foreign Communication From a Counterpart Application, PCT Application No. PCT/CN2013/083133, Written Opinion dated Dec. 13, 2013, 5 pages.

* cited by examiner

CHANNEL ESTIMATION FOR OPTICAL ORTHOGONAL FREQUENCY DIVISION MULTIPLEXING SYSTEMS

CROSS-REFERENCE TO RELATED APPLICATIONS

The present application claims priority to U.S. Provisional Patent Application No. 61/698,128 filed Sep. 7, 2012 by Mandi Zamani, et al. and entitled "Channel Estimation for Coherent Optical OFDM," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Orthogonal frequency-division multiplexing (OFDM) offers a robust multicarrier modulation technique in optical communications to meet rapidly increasing bandwidth demands. High speed data transmissions may be carried over many lower rate subcarriers across a transmission channel. During transmission, the OFDM signal becomes distorted due to a combination of channel effects that a receiver must be able to estimate in order to mitigate the distortion. Special data symbols may be used in OFDM symbols to assist receivers in performing this channel estimation during signal reconstruction, such as training symbols, preambles, and pilot subcarriers. These special data symbols are predetermined signals known by the receiver, and consequently assist in channel estimation. However, the bandwidth consumed by these special data symbols is a reduction in bandwidth available for customer data.

SUMMARY

In one embodiment, the disclosure includes an apparatus comprising an optical receiver configured to receive a plurality of OFDM symbols, wherein the plurality of OFDM symbols comprises a first OFDM symbol and a second OFDM symbol, and a processor coupled to the optical receiver and configured to generate a first decoded signal based on the first OFDM symbol, estimate a plurality of channel parameters adaptively based on the first decoded signal, and generate a second decoded signal based on the second OFDM symbol, wherein the second decoded signal is generated using the plurality of channel parameters.

In another embodiment, the disclosure includes an apparatus comprising an optical transmitter configured to transmit an OFDM signal to an optical receiver via an optical transmission channel, wherein the OFDM signal comprises a plurality of subcarriers, and a processor coupled to the optical transmitter and configured to generate a number of pilot subcarriers for transmission only during an initialization of the optical receiver, wherein the optical receiver performs a phase recovery on the OFDM signal based upon the pilot subcarriers, and generate a number of preambles for transmission during the initialization phase, wherein the optical receiver performs an initial estimation of a plurality of channel parameters based upon the preambles.

In another embodiment, the disclosure includes a method of optical communication comprising receiving a plurality of OFDM symbols, wherein the plurality of OFDM symbols comprises a first OFDM symbol and a second OFDM symbol, generating a first decoded signal based on the first OFDM symbol, estimating a plurality of channel parameters adaptively based on the first decoded signal, and generating a second decoded signal based on the second OFDM symbol, wherein the second decoded signal is generated using the plurality of channel parameters.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a DF-CE system, apparatus, and/or method for estimation of transmission channel parameters by an optical receiver. Pilot subcarriers may be used for phase recovery during an initialization phase and preambles may be transmitted before OFDM symbols for initial channel approximation. The DF-CE method disclosed may require less than 128 preambles for channel approximation. In some instances, the disclosed method may require as few as 8 preambles and 8 pilot subcarriers. After an initial channel estimation, channel parameters may be updated adaptively after decoding every OFDM symbol using a decision feedback from demodulator to the channel estimator. LS and MMSE algorithms may be utilized at this channel estimator module. Use of the disclosed DF-CE method may reduce preamble length and increase spectral efficiency.

Figure 1:
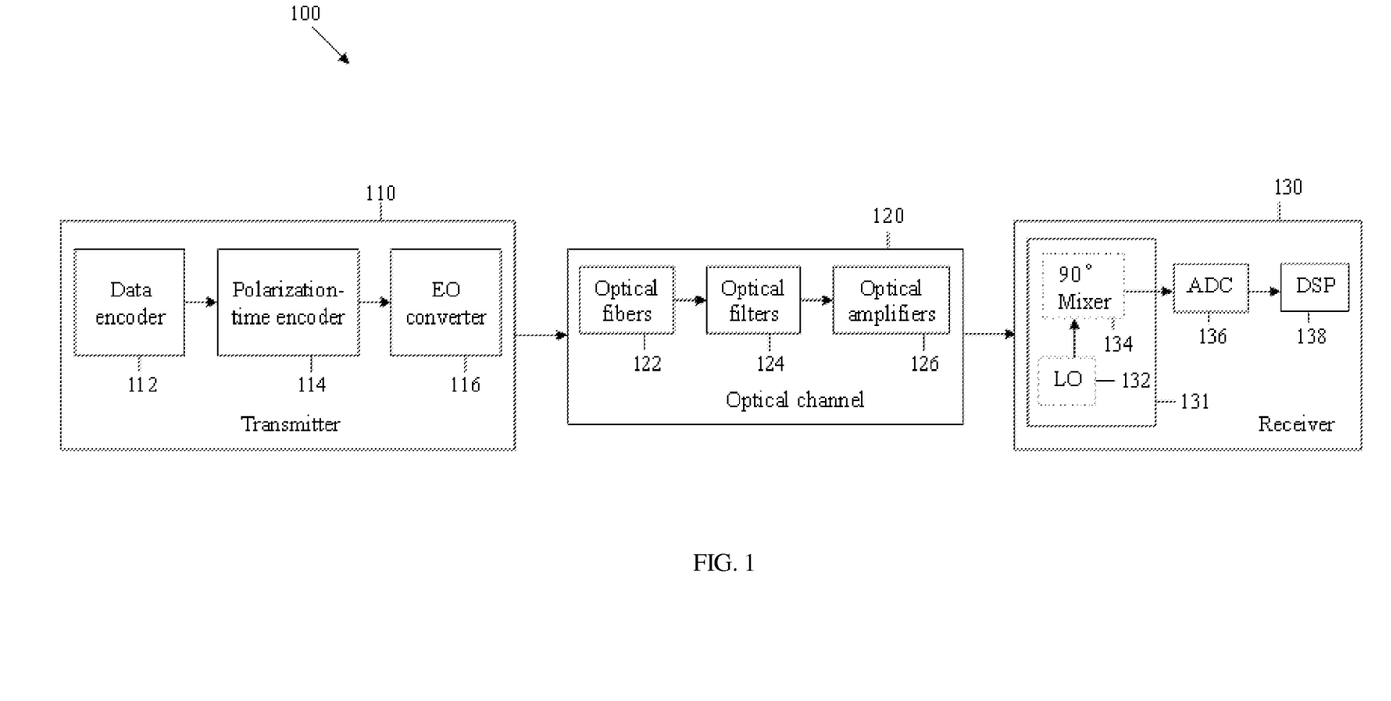
FIG. 1 is a schematic diagram of an embodiment of a transportation link in a coherent optical orthogonal frequency-division multiplexing (CO-OFDM) optical network.

A schematic diagram of an embodiment of a transportation link 100 in a CO-OFDM optical network is shown in FIG. 1.

Transportation link 100 may be implemented to communicate data between nodes of an optical network. Also, transportation link 100 may be a single-carrier or multi-carrier system. Transportation link 100 may comprise an optical transmitter 110, an optical channel 120, and an optical receiver 130 arranged as illustrated in FIG. 1. The optical transmitter 110 may comprise a data encoder 112, a polarization-time encoder 114, and an electrical-to-optical (EO) converter 116. In an embodiment, the data encoder 112 may comprise a forward error correction (FEC) encoder and an optical modulator, such as an 8, 16, 32, or 64 quadrature amplitude modulator (QAM) or a Quadrature Phase Shift Keying (QPSK) modulator. The polarization-time encoder 114 may further encode (or transform) the symbols modulated in the data encoder 112, in order to combat the effect of Polarization Dependent Loss (PDL) in an optical fiber. The output of the polarization-time encoder 114 may be multiplexed. For example, four data streams may be formatted as two orthogonal liner polarization signals (X and Y polarizations), wherein each polarization component may comprise two orthogonal phase components (an in-phase I and a quadric-phase Q). The EO converter 116 may convert the polarization signals to optical signals that are suitable for transmission in an optical fiber.

The optical channel 120 may be configured to transport optical signals from the transmitter 110 to the receiver 130, and as such may comprise one or more optical fibers 122, optical filters 124 and optical amplifiers 126. The optical channel 120 may also comprise one or more wavelength-selective switches (WSSs). Such components of the optical channel 120 may introduce undesired signal changes, such as chromatic dispersion, nonlinear phase noise, polarization mode dispersion, polarization dependent loss and/or gain, polarization rotation, optical white Gaussian noise, or combinations thereof. These components of the optical channel may be hereinafter referred to as channel state information (CSI). For example, undesired signal changes may include amplitude and/or phase distortion due to cascaded WSSs.

The receiver 130 may receive optical signals in successive time slots. The receiver 130 may comprise an integrated coherent receiver 131, an analog-to-digital converter (ADC) 136 coupled to the integrated coherent receiver 131, and a DSP unit 138 coupled to the ADC 136. The integrated coherent receiver 131 may receive an optical signal input and generate one or more electrical signal outputs. The integrated coherent receiver 131 may comprise a laser serving as a local oscillator (LO) 132 and a 90° mixer 134 coupled to the LO 132. The 90° mixer 134 may comprise an about 90° optical cross network mixer and a photodetector (e.g. a p-type/intrinsic/n-type (PIN) diode), and may be configured to mix the received orthogonal components of the optical signal from the transmitter 110 and split the signal into a plurality of signals, where each signal may be a combination of the orthogonal signal components. The 90° mixer 134 may mix the received optical signal components with an optical signal from the LO 132 that may have a same or about the same carrier frequency of the transmitted optical signal. The output from the 90° mixer 134 may split a received signal into four signals, with each signal being a mixture of transmitted data signals. The output mixed signals from the 90° mixer 134 may then be converted by the ADC 136 (e.g., from analog to digital) and forwarded to the DSP unit 138, which may be configured to process the signals and recover the data in the transmitted signal, as discussed further in detail later. A DSP unit 138 may also be referred to simply as a DSP, and the DSP unit 138 may comprise an application specific integrated circuit (ASIC) DSP. The disclosed method of channel estimation in an optical OFDM network is explained in the context of a CO-OFDM for illustration purposes only. The disclosed method may equally apply to any optical OFDM network.

Figure 2:
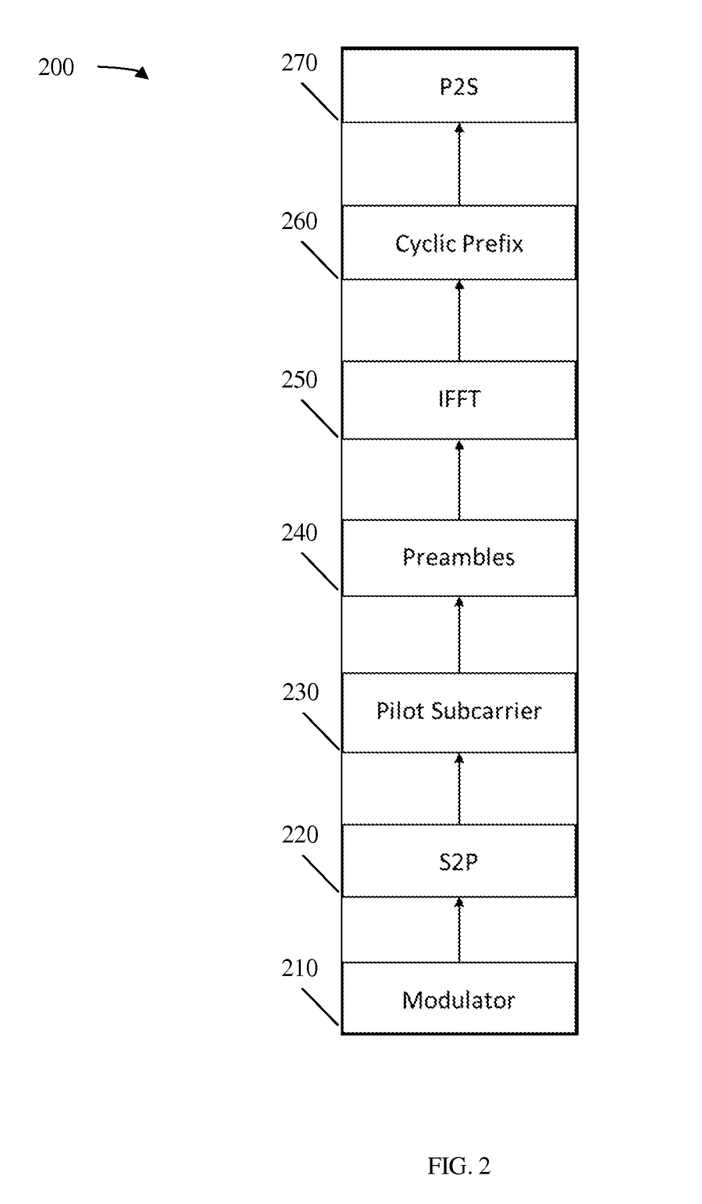
FIG. 2 is a schematic diagram of an embodiment of a CO-OFDM transmitter.

FIG. 2 is a schematic diagram of an embodiment of a CO-OFDM transmitter 200. For example, transmitter 200 may correspond to optical transmitter 110 of FIG. 1. An input data stream comprising a plurality of bits may be received at an input of a modulator 210, which may use any known modulation format such as QAM or QPSK. Modulator 210 may be configured to map blocks of the input data stream bits into data symbols (e.g. 16 QAM constellation point symbols), and output a serial data symbol stream to an input of a serial-to-parallel (S2P) converter 220. S2P converter 220 may be configured to convert the serial symbol data stream into parallel frequency domain symbol streams. S2P converter 220 may then forward the parallel frequency-domain symbol streams to a pilot subcarrier block 230. Pilot subcarrier block 230 may add pilot subcarriers comprising symbols known to a receiver (e.g. receiver 130 of FIG. 1) in parallel to the parallel frequency-domain symbol streams. Pilot subcarriers may assist a receiver with countering a phase rotation of the transmitted signal due to a residual frequency offset induced by an optical channel (e.g. optical channel 120 of FIG. 1). Preambles may be inserted at preamble block 240 and the parallel frequency-domain symbol streams may be forwarded to inverse fast Fourier transform (IFFT) module 250. The transmitter 200 may insert preambles at the beginning of each subcarrier during an initialization phase. In an embodiment, preamble block 240 may insert preambles such that an X polarization component of the transmitted signal at a time t may transmit a known transmitted symbol A while a Y polarization component transmits nothing. At time t+1, X polarization component transmits nothing and the Y polarization component transmits A. This process may be repeated for a plurality of OFDM symbols for time averaging. IFFT modulator 250 may perform an IFFT to generate a time-domain digital baseband OFDM signal by giving a set of complex time-domain samples of the parallel frequency-domain symbol streams. A cyclic prefix (CP) may be added to the time-domain digital baseband signal at CP block 260 to maintain orthogonality of the sub-channels and prevent inter-symbol interference (ISI). A CP may be a copy of a portion of an OFDM symbol that may be inserted into a guard interval between each OFDM symbol. After CP insertion, the time-domain digital baseband OFDM signal may be forwarded to an input of a parallel-to-serial (P2S) converter 270. P2S converter 270 may be configured to convert the time-domain digital baseband OFDM signal into a serial base-band radio frequency (RF) signal that may be up converted to the optical-domain by an optical in-phase, quadrature (I/Q) modulator for transmission across an optical channel (e.g. optical channel 120 of FIG. 1).

Figure 3:
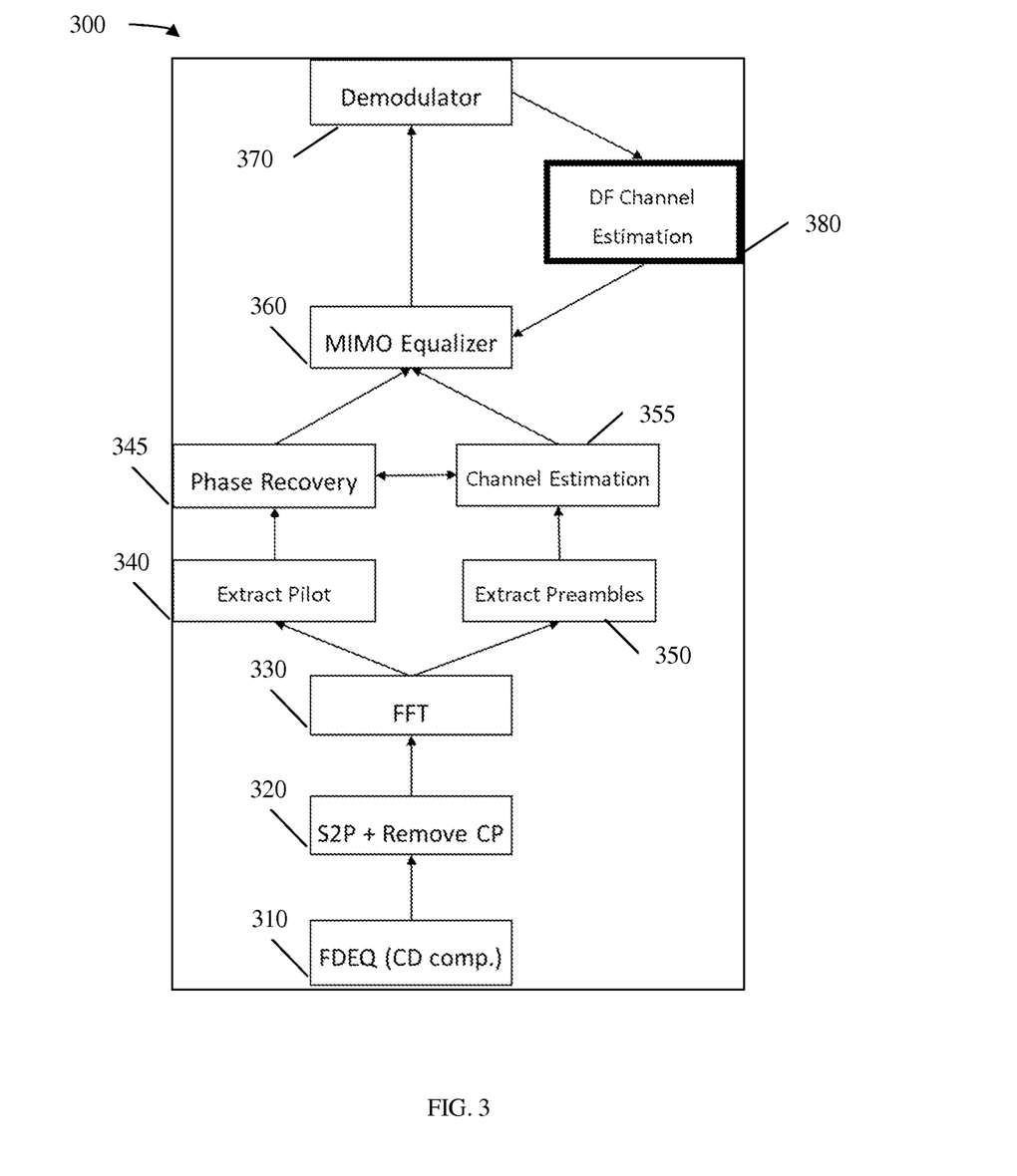
FIG. 3 is a schematic diagram of an embodiment of a CO-OFDM receiver digital signal processing (DSP) unit.

FIG. 3 is a schematic diagram of an embodiment of a CO-OFDM receiver DSP unit 300 for decoding and demodulating OFDM optical signals. For example, the DSP unit 300 may correspond to DSP unit 138 in FIG. 1. Signals (comprising samples) digitized by an ADC, such as the ADC 136 in FIG. 1, may be fed into DSP unit 300 in successive time slots. In each time slot, DSP unit 300 may be configured to receive two complex-valued signals corresponding to two orthogonal polarization components. Each complex-valued polarization component may comprise two real-valued signals (i.e., an in-phase I and a quadric-phase Q), since each component may utilize QPSK signaling. Frequency-Domain Equalizer (FDEQ) 310 may use a transfer function to compensate for chromatic dispersion, a modem response, and amplitude distortion due to the presence of one or more WSSs between a transmitter and receiver.

FDEQ 310 may be configured to perform filtering in the frequency-domain. For two complex-valued input signals, assuming complete mitigation of polarization mode dispersion (PMD) and filtering effects, FDEQ 310 may generate two complex-valued output signals using an equation:

Equation 1

$$\begin{bmatrix} E_X^0 \\ E_Y^0 \end{bmatrix} = \begin{bmatrix} \lambda_X & 0 \\ 0 & \lambda_Y \end{bmatrix} \begin{bmatrix} \cos(\theta) & \sin(\theta)e^{j\varphi} \\ -\sin(\theta)e^{-j\varphi} & \cos(\theta) \end{bmatrix} \begin{bmatrix} E_X^i \\ E_Y^i \end{bmatrix} + \begin{bmatrix} Z_X \\ Z_Y \end{bmatrix} \quad (1)$$

Where:
$E_X^0$=X polarization component of FDEQ output
$E_Y^0$=Y polarization component of FDEQ output
$\lambda_X$=Polarization Dependent Loss (PDL) in the X polarization
$\lambda_Y$=PDL in the Y polarization
$\theta$=initial polarization rotation angle
$\varphi$=polarization rotation angle between
$E_X^i$=X polarization component of transmitter encoder output (e.g. polarization-time encoder 214 in FIG. 2)
$E_Y^i$=Y polarization component of transmitter encoder output
$Z_X$=X polarization component of additive noise added to transmitted signal during transmission (e.g. random noise with a Gaussian distribution)
$Z_Y$=Y polarization component of additive noise added to transmitted signal during transmission After equalization in the frequency-domain, FDEQs 310 may forward the two complex-valued output signals to an S2P converter 320. S2P converter 320 may then convert the serial time-domain digital baseband OFDM signal into parallel time-domain symbol streams. S2P converter 320 may be further configured to remove CPs added by a transmitter's CP sub-module (e.g. CP block 260 of FIG. 2) prior to forwarding the parallel time-domain symbol streams to fast Fourier transform (FFT) module 330. FFT module 330 may convert the parallel time-domain data symbol streams into parallel frequency-domain symbol streams and forward the parallel frequency-domain symbol streams to a pilot extraction block 340 and a preamble extraction block 350.

Pilot subcarriers added by a transmitter (e.g. transmitter 110 of FIG. 1) may be separated from the parallel frequency-domain symbol streams by pilot extraction block 340 and forwarded to a phase recovery module 345. Phase recovery module 345 may be configured to recover a phase of the subcarriers of the transmitted signal. This phase recovery may enable the receiver to synchronize with the transmitted OFDM frames by correcting the timing of the received subcarriers, which may be offset due to fiber dispersion. Since the laser phase noise distribution may be a random walk, the phase noise in preambles and data symbols may be different. Thus, a channel estimator may not recover the phase noise. Phase recovery block 345 may remove a calculated phase noise by subtracting a time averaged phase noise determined from the pilot subcarriers. In an embodiment, a small number of pilot subcarriers may be sufficient (e.g. 8 with a 0.2 Megahertz (MHz) laser line width).

Preambles inserted at the beginning of each subcarrier during an initialization phase of channel estimation may be removed by preamble extraction block 350 and forwarded to initiation channel estimation block 355. Initiation channel estimation block 355 may be configured to determine initial optimal equalizer coefficients to mitigate channel effects on the received signal to aid in reconstruction of the transmitted input data stream. In an embodiment, the initialization phase of channel estimation may be performed during initialization of a receiver. An output from phase recovery block 345 may also enable a MIMO equalizer 360 to remove phase noise distortion from the preambles.

In an embodiment, a combined fiber channel in frequency-domain may be expressed as:

Equation 2

$$\begin{bmatrix} R_X(t) \\ R_Y(t) \end{bmatrix} = \begin{bmatrix} H_{11} & H_{12} \\ H_{21} & H_{22} \end{bmatrix} \begin{bmatrix} S_X(t) \\ S_Y(t) \end{bmatrix} \quad (2)$$

Where:
$R_X$=X polarization component of received signal
$R_Y$=Y polarization component of received signal
$S_X$=X polarization component of transmitted signal
$S_Y$=Y polarization component of transmitted signal
$H_{\#\#}$=channel parameters For example, an X polarization component of the transmitted signal at a time $t_1$ may transmit a known transmitted symbol A while a Y polarization component transmits nothing. At time $t_2$, the X polarization component transmits nothing, and the Y polarization component transmits A. In this embodiment, the channel parameters may be calculated by:

Equation 3

$$H_{11} = \frac{R_X(t_1)}{A}, H_{21} = \frac{R_Y(t_1)}{A}, H_{12} = \frac{R_X(t_2)}{A}, H_{22} = \frac{R_Y(t_2)}{A} \quad (3)$$

Due to amplified spontaneous emission (ASE), there may be estimation error. To compensate this error, frequency domain and/or time domain averaging may be performed. The channel parameters may be similar in adjacent frequency bands when a long FFT window length is used, and consequently, frequency-domain averaging may be useful. This method may be referred to as intra-symbol frequency domain averaging (ISFA). However, neighboring channels may have different parameters when a short FFT window length is used, and consequently, time-domain averaging instead of frequency-domain averaging may be needed and a plurality of preambles pairs may be transmitted. Thus, time-domain averaging may require more preambles when compared with frequency-domain averaging, but it may be more reliable in OFDM systems with short FFT window lengths. Additionally, both time-domains and frequency-domains averaging may be performed.

The parallel frequency-domain symbol streams may be forwarded to MIMO equalizer 360 after channel estimation and phase recovery by phase recovery block 345 and initiation channel estimation block 355. MIMO equalizer 360 may perform channel effects mitigation on the parallel frequency-domain symbol streams as discussed supra. A maximum-likelihood (ML) detector or a one-tap equalizer may be used for this channel effects mitigation. In an embodiment, different one-tap 2×2 MIMO equalizations may be performed on each subcarrier. MIMO equalizer 360 may then forward the parallel frequency-domain symbol streams to demodulator 370. Demodulator 370 may be configured to recover an estimation of the transmitted input data stream from the parallel frequency-domain symbol streams. After applying initial optimal equalizer coefficients to a current OFDM symbol, a sample from demodulator 370 may be forwarded to DF-CE block 380. DF-CE block 380 may use the sample to update the equalizer coefficients using an adaptive algorithm during an adaptive phase of channel estimation, which will be described supra. DF-CE block 380 may output the updated equalizer coefficients to MIMO equalizer 360 for use with a subsequent OFDM symbol.

Figure 4:
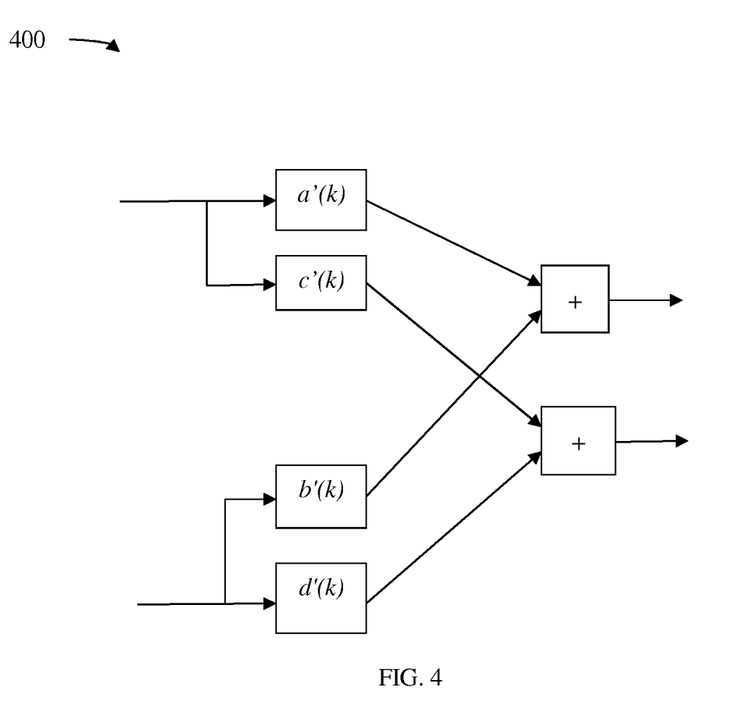
FIG. 4 is a schematic diagram of an embodiment of a one-tap 2×2 multiple-in multiple-out (MIMO) equalizer.

FIG. 4 is a schematic diagram of an embodiment of a one-tap 2×2 MIMO equalizer 400. Optimal equalizer coefficients (i.e. a'(k), b'(k), c'(k), and d'(k)) may be initially established during an initialization phase of channel estimation using phase recovery and channel estimation logic (e.g. phase recovery block 345 and channel estimation block 355). After the initial phase channel estimation, an adaptive phase channel estimation may update the equalizer coefficients after decoding each OFDM symbol with DF-CE logic (e.g. DF-CE block 380) using an LS algorithm. Also, if a noise variance and a channel state information (CSI) covariance matrix are available, MMSE algorithm may also be performed, which provides a higher performance at a cost of complexity. The difference between performances of LS and MMSE may be small for low dispersion fibers, but in the presence of large chromatic dispersion (CD) in reduced guard interval (RGI) OFDM, MMSE may outperform LS.

In decision feedback LS (DF-LS) the disclosure may update the CSI at time t in subcarrier f as:

Equations 4 and 5

$$H(t) = \alpha H(t-1) + (1-\alpha)(S^H \times S)^{-1} \times S^H \times R(f, 1:t-1) \quad (4)$$

Where:
S=decoded signal
$S^H$=conjugate transpose of S
R=received signal $$\alpha = \frac{Nprmbl}{Nprmbl + t} \quad (5)$$

Where:
$N_{prmbl}$=number of preambles

In decision feedback MMSE (DF-MMSE), the disclosure may update the CSI at time t in subcarrier f as:

Equation 6

$$H(t) = \alpha H(t-1) + (1-\alpha) R_{HH} \times (\sigma_N^2 (S^H \times S)^{-1} + R_{HH})^{-1} \times (S^H \times S)^{-1} \times S^H \times R(f, 1:t-1) \quad (6)$$

Where:
$R_{HH}$=covariance matrix of the channel state information (CSI)
$\phi_N^2$=noise power In an embodiment, different one-tap 2×2 MIMO equalizations may perform on each subcarrier. If the channel estimated at the $k^{th}$ subcarrier is:

Equations 7 and 8

$$H(k) = \begin{bmatrix} a(k) & b(k) \\ c(k) & d(k) \end{bmatrix} \quad (7)$$

the one-tap equalizer coefficients may be:

$$H^{-1}(k) = \frac{1}{a(k)d(k) - b(k)c(k)} \begin{bmatrix} d(k) & -b(k) \\ -c(k) & a(k) \end{bmatrix} = \begin{bmatrix} a'(k) & b'(k) \\ c'(k) & d'(k) \end{bmatrix} \quad (8)$$

Figure 5:
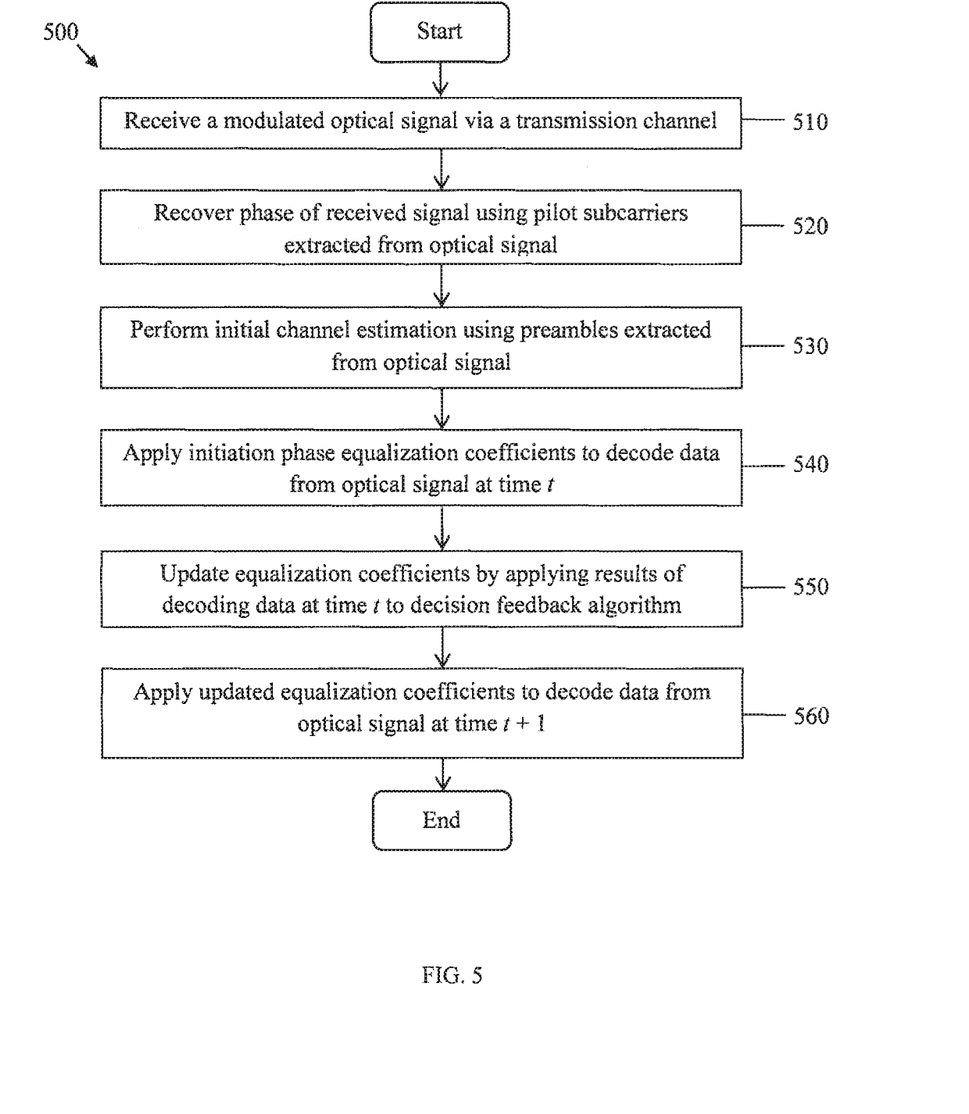
FIG. 5 is a flowchart of an embodiment of a decision feedback channel estimation (DF-CE) method.

FIG. 5 is a flowchart of an embodiment of a DF-CE method 500, which may be implemented in a receiver (e.g. receiver 130 in FIG. 1) of an optical communication system. The method 500 may start in step 510, where a modulated optical signal may be received via an optical transmission channel. Next, in step 520, a plurality of pilot subcarriers may be extracted from the received optical signal and processed to determine an estimated phase noise correction. The estimated phase noise correction may be applied to the received optical signal to mitigate phase noise distortions induced by the optical transmission channel. At step 530, phase noise corrected preambles may be extracted from the received optical signal to determine initial estimated channel parameters for establishing equalization coefficients during an initialization phase. The equalization coefficients may be calculated based on the estimated phase noise correction factor and the initial estimated channel parameters determination. In an embodiment, preambles received consecutively in time may be used for time and/or intra-symbol frequency averaging. Next, in step 540, the initiation phase equalization coefficients may be used to decode data from the received optical signal at time t. At step 550, the equalization coefficients may be updated during an adaptive phase by applying results from decoding data at time t to a decision feedback algorithm. In an embodiment, the decision feedback algorithm used may comprise an LS algorithm. The equalization coefficients may be updated periodically for each subcarrier. If noise variance and a CSI covariance matrix are available, a MMSE algorithm may also be used. Finally, in step 560, the adaptive phase equalization coefficients may be used to decode data from the received optical signal at time t+1.

Figure 6:
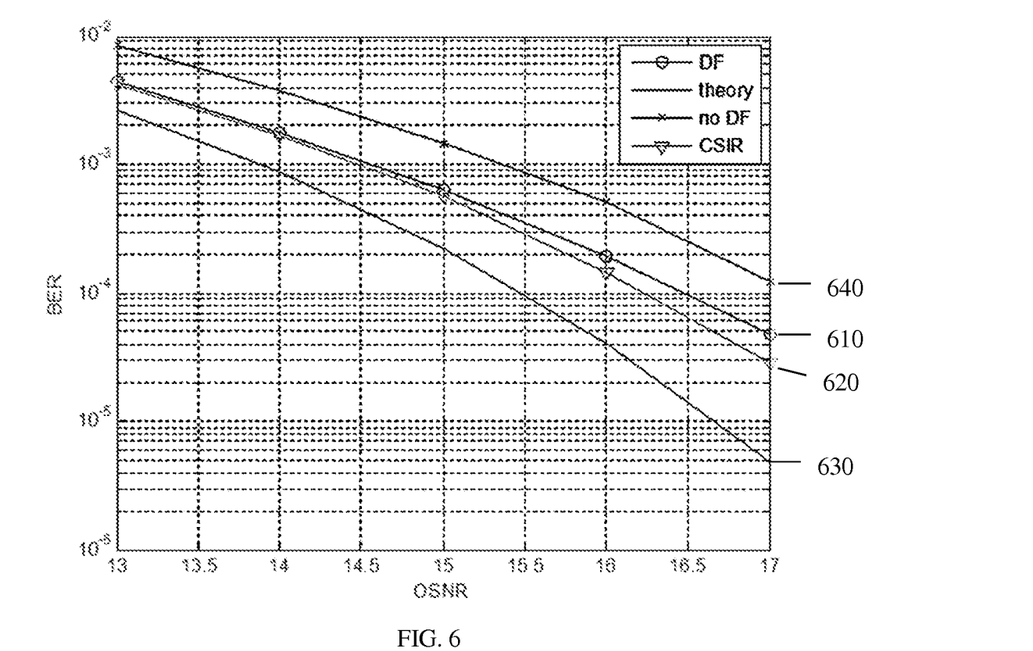
FIG. 6 shows bit error rate (BER) versus optical signal-to-noise ratio (OSNR) waterfall curves of a transmission link utilizing least squares (LS) estimation.
Figure 7:
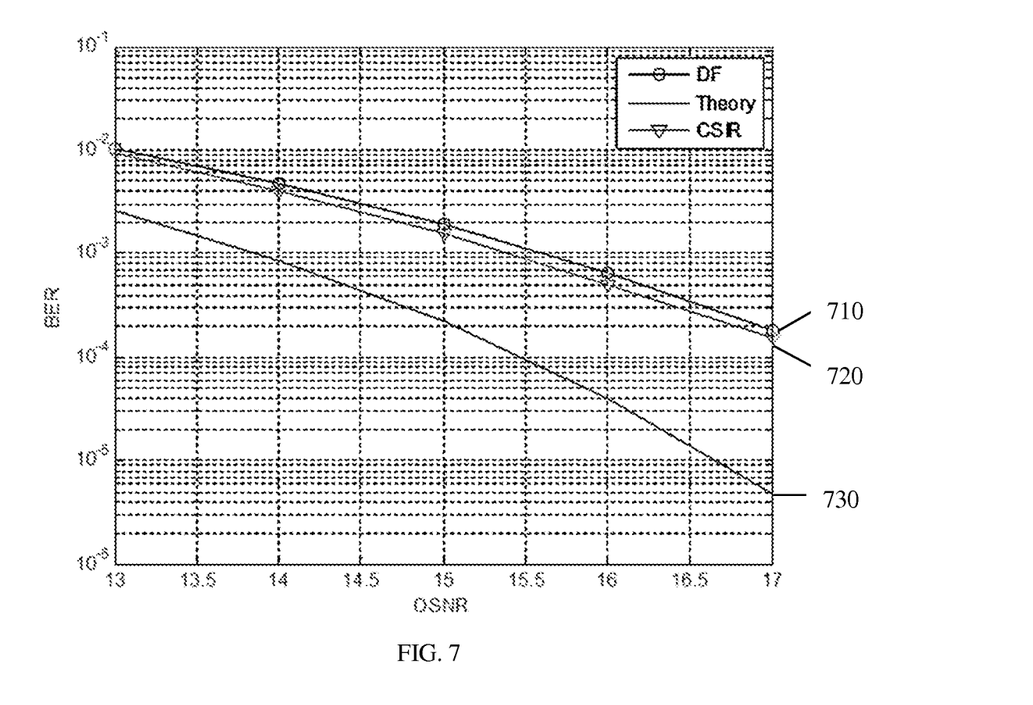
FIG. 7 shows three BER versus OSNR waterfall curves of a transmission link utilizing minimum means square estimation (MMSE).

The performance of the disclosed DF-CE schemes have been tested and compared with conventional schemes on a CO-OFDM transmission link (e.g. transmission link 100) under various conditions. FIGS. 6 and 7 show graphs illustrating BER versus OSNR performance comparisons under several DF-CE scenarios utilizing LS estimation and MMSE respectively. A spectral efficiency (SE) factor in OFDM may be written as:

Equation 9

$$\frac{(Ns - Nprmbl)(Nsc - Ncp - Nps)}{Nsc \times Ns} \quad (9)$$

Where:
$N_{sc}$=a total number of subcarriers including pilot subcarriers and cyclic prefixes
$N_s$=a total number of OFDM symbols including preambles
$N_{prmbl}$=a number preambles
$N_{cp}$=length of cyclic prefix
$N_{ps}$=a number of pilot subcarriers For example, if CD is compensated completely using RGI-OFDM, a max differential group delay (DGD) of 100 picoseconds (ps), a baud rate ($f_{Baud}$) of 32 gigabits per second, an FFT length of 256, and a channel dynamic of 100 kilohertz (KHz), then SE may become:

$$\frac{(1250-128)(256-4-8)}{320000} = 0.8555 = 85.55\%.$$

This may be due to conventional OFDM channel estimation methods requiring approximately 128 preambles for accurate channel estimation. Thus, conventional preamble-based channel estimation may result in a 14.45% SE loss. However, under the disclosed DF-CE method, fewer preambles may be used (e.g. 8 preambles). In an embodiment, if 8 preambles are used, SE may become:

$$\frac{(1250-8)(256-4-8)}{320000} = 0.947 = 94.7\%.$$

Thus, when 8 preambles are used for channel estimation under the disclosed DF-CE method, the SE loss may be 5.3%.

FIG. 6 shows four waterfall curves (i.e., BER versus OSNR) of a transmission link with and without DF-CE utilizing LSE when 8 preambles and 8 pilot sub-carriers are used. The transmission link of FIG. 6 comprises a channel with state of polarization (SOP) rotation angle θ=0 and PDL=6. It may be seen that the BER versus OSNR curves show an approximate 0.75 decibel (dB) improvement at 0.1% BER with DF-CE (curve 610) than without (curve 640), demonstrating an improved performance due to DF-CE. Also, the BER versus OSNR curves demonstrate at 0.1% BER the transmission link with DF-CE utilizing LS estimation (curve 610) performs similarly to a transmission link with CSI at the receiver (curve 620). A theoretic best value is also demonstrated (curve 630), which has yet to be realized in practice.

FIG. 7 shows three BER versus OSNR waterfall curves of a transmission link with DF-CE utilizing MMSE and a channel with SOP rotation angle θ=45 and PDL=6. It may be seen that the BER versus OSNR waterfall curves show a transmission link with DF-CE utilizing MMSE (curve 710), again performs similar to a transmission link with CSI at the receiver (curve 720) at 0.1% BER. Again, a theoretic best value is also demonstrated (curve 730), which has yet to be realized in practice.

Figure 8:
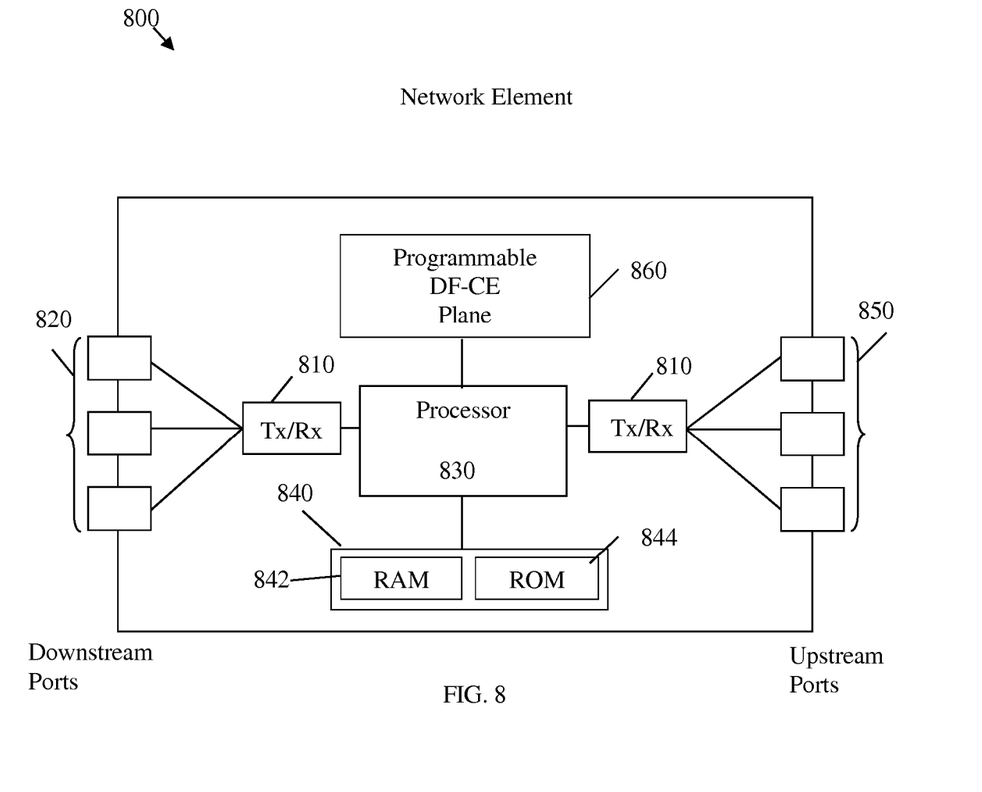
FIG. 8 is a schematic diagram of an embodiment of a network element.

At least some of the features/methods described in the disclosure may be implemented in a network element. For instance, the features/methods of the disclosure may be implemented using hardware, firmware, and/or software installed to run on hardware. For example, the network element may be any device that transports data through a network, e.g., a switch, router, bridge, server, client, etc. FIG. 8 is a schematic diagram of an embodiment of a network element (NE) 800, which may comprise an optical transmitter 110, an optical channel 120, and/or an optical receiver 130. For instance, the network element 800 may be configured to handle pilot subcarriers and preambles.

The network element 800 may comprise one or more ingress ports or faces coupled to a transceiver (Tx/Rx) 810, which may be transmitters, receivers, or combinations thereof. A Tx/Rx 810 may be coupled to plurality of downstream ports 820 for transmitting and/or receiving OFDM symbols from other nodes. Tx/Rx 810 may be coupled to a plurality of upstream ports 850 for transmitting and/or receiving OFDM symbols from other nodes. A processor 830 may be coupled to the Tx/Rxs 810 to process the frames and/or determine the nodes to which to send frames. The processor 830 may comprise one or more multi-core processors and/or memory modules 840, which may function as data stores, buffers, etc. Processor 830 may be implemented as a general processor or may be part of one or more ASICs and/or DSPs. The downstream ports 820 and/or upstream ports 850 may contain electrical and/or optical transmitting and/or receiving components. Network element 800 may or may not be a routing component that makes routing decisions. The network element 800 may also comprise a programmable DF-CE plane block 860. The programmable DF-CE plane block 860 may be configured to implement DF-CE functions, such as at an application layer or layer 3 (L3) in the Open Systems Interconnection (OSI) model, where the equalizer coefficients may be updated based on updated CSI. Such equalizer coefficient information may be maintained in a content table at the memory module 840. The programmable DF-CE plane block 860 may interpret phase recovery information from a phase recovery block (e.g. phase recovery block 345 of FIG. 3), channel estimation information from a channel estimation block (e.g. channel estimation block 355), and decision feedback from a demodulator (e.g. demodulator 370) to update the equalizer coefficients. The programmable DF-CE plane block 860 may then forward the updated equalizer coefficients to a MIMO equalizer (e.g. MIMO equalizer 360 of FIG. 3). The programmable DF-CE plane block 860 may be implemented using software, hardware, or both and may operate above the internet protocol (IP) layer or layer 2 (L2) in the OSI model. The memory module 840 may comprise a cache 842 for temporarily storing content, e.g., a Random Access Memory (RAM). Additionally, the memory module 840 may comprise a long-term storage 844 for storing content relatively longer, e.g., a Read Only Memory (ROM). For instance, the cache 842 and the long-term storage 844 may include Dynamic random-access memories (DRAMs), solid-state drives (SSDs), hard disks, or combinations thereof. Notably, the memory module 840 may be used to house the instructions for carrying out the system and methods described herein.

It is understood that by programming and/or loading executable instructions onto the network element 800, at least one of the processors 830, the cache 842, and the long-term storage 844 are changed, transforming the network element 800 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.6, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   an optical receiver configured to receive an optical signal comprising Nprmbl preambles and a plurality of orthogonal frequency-division-multiplexed (OFDM) symbols, wherein Nprmbl denotes a number of the preambles, and wherein the plurality of OFDM symbols comprises a first OFDM symbol and a second OFDM symbol; and
   a processor coupled to the optical receiver and configured to:
   generate a first decoded signal based on the first OFDM symbol;
   estimate a plurality of channel parameters adaptively based on the first decoded signal and based on Nprmbl; and
   generate a second decoded signal based on the second OFDM symbol, wherein the second decoded signal is generated using the plurality of channel parameters.

2. The apparatus of claim 1, wherein the plurality of channel parameters is estimated using a least square (LS) algorithm.

3. The apparatus of claim 2, wherein the first OFDM symbol and the second OFDM symbol are received at time t−1 and t respectively, wherein H denotes each of the plurality of channel parameters, wherein S denotes the first decoded signal, wherein $S^H$ denotes a conjugate transpose of S, wherein $$\alpha = \frac{Nprmbl}{Nprmbl+t},$$

and wherein H is computed according to an equation:

$$H(t)=\alpha H(t-1)+(1-\alpha)(S^H \times S)^{-1} \times S^H \times R(f,1:t-1).$$

4. The apparatus of claim 3, wherein the processor is further configured to perform intra-symbol frequency-domain averaging (ISFDA) to compensate for amplified spontaneous emission noise (ASEN).

5. The apparatus of claim 3, wherein the processor is further configured to perform time domain averaging to compensate for amplified spontaneous emission noise (ASEN).

6. The apparatus of claim 1, wherein the optical receiver is a coherent detection OFDM (CO-OFDM) receiver.

7. The apparatus of claim 1, wherein the plurality of OFDM symbols comprises intensity modulated data, and wherein the optical receiver is a direct detection OFDM (DD-OFDM) receiver.

8. The apparatus of claim 1, wherein the plurality of channel parameters is estimated using a minimum mean-square error (MMSE) algorithm.

9. The apparatus of claim 8, wherein the first and the second OFDM symbols comprise a subcarrier denoted as f and are received at time t−1 and t respectively, wherein H denotes each of the plurality of channel parameters, wherein S denotes the first decoded signal, wherein $S^H$ denotes a conjugate transpose of S, wherein $$\alpha = \frac{Nprmbl}{Nprmbl+t},$$

wherein $R_{HH}$ denotes a covariance matrix of channel state information (CSI), wherein $\sigma_N^2$ denotes a noise power, and wherein H is computed according to an equation:

$$H(t)=\alpha H(t-1)+(1-\alpha)R_{HH}\times(\sigma_N^2(S^H\times S)^{-1}+R_{HH})^{-1}\times(S^H\times S)^{-1}\times S^H\times R(f,1:t-1)$$

10. The apparatus of claim 1, wherein the processor is further configured to generate the second decoded signal using a multiple-input and multiple-output (MIMO) equalizer comprising a plurality of coefficients, wherein each of the plurality of coefficients comprises one tap, and wherein the plurality of channel parameters is denoted as a(k), b(k), c(k), and d(k), wherein the plurality of the MIMO equalizer's coefficients is denoted as a'(k), b'(k), c'(k), and d'(k), wherein the first and the second OFDM symbols comprise a subcarrier denoted as f, and wherein the plurality of coefficients has the following relationship with the plurality of channel parameters:

$$\begin{bmatrix} a'(k) & b'(k) \\ c'(k) & d'(k) \end{bmatrix} = \frac{1}{a(k)d(k)-b(k)c(k)} \begin{bmatrix} a(k) & b(k) \\ c(k) & d(k) \end{bmatrix}.$$

11. The apparatus of claim 1, wherein the first decoded signal is not a training signal.

12. The apparatus of claim 1, wherein the processor is further configured to perform phase recovery and channel estimation on the first OFDM symbol using a number of pilot subcarriers prior to generating the first decoded signal.

13. An apparatus comprising:
an optical transmitter configured to transmit an orthogonal frequency-division-multiplexed (OFDM) signal to an optical receiver via an optical transmission channel, wherein the OFDM signal comprises a plurality of subcarriers; and
a processor coupled to the optical transmitter and configured to:
generate, during an initialization of the optical receiver, pilot subcarriers for the optical receiver to perform a phase recovery on the OFDM signal based upon the pilot subcarriers; and
generate, during the initialization, Nprmbl preambles for the optical receiver to perform an initial estimation of a plurality of channel parameters based upon Nprmbl, wherein Nprmbl denotes a number of the preambles.

14. The apparatus of claim 13, wherein the OFDM signal comprises a plurality of OFDM symbols comprising a first OFDM symbol for the optical receiver to generate a first decoded signal based on the first OFDM symbol and to estimate the plurality of channel parameters adaptively based on the first decoded signal, and wherein the plurality of OFDM symbols further comprises a second OFDM symbol for the optical receiver to generate, using the plurality of channel parameters, a second decoded signal based on the second OFDM symbol.

15. The apparatus of claim 13, wherein the OFDM signal comprises intensity modulated data, and wherein the optical receiver is a direct detection OFDM (DD-OFDM) receiver.

16. The apparatus of claim 13, wherein the optical receiver is a coherent detection OFDM (CO-OFDM) receiver.

17. An optical communication method comprising:
receiving an optical signal comprising Nprmbl preambles and a plurality of orthogonal frequency-division-multiplexed (OFDM) symbols, wherein Nprmbl denotes a number of the preambles, and wherein the plurality of OFDM symbols comprises a first OFDM symbol and a second OFDM symbol;
generating a first decoded signal based on the first OFDM symbol;
estimating a plurality of channel parameters adaptively based on the first decoded signal and based on Nprmbl; and
generating a second decoded signal based on the second OFDM symbol and using the plurality of channel parameters.

18. The method of claim 17, further comprising performing a phase recovery and channel estimation on the first OFDM symbol using a number of pilot subcarriers prior to generating the first decoded signal.

19. The method of claim 17, wherein the plurality of OFDM symbols is received via a coherent detection OFDM (CO-OFDM) optical system.

20. The method of claim 17, wherein the plurality of OFDM symbols comprises intensity modulated data, and wherein the plurality of OFDM symbols is received via a direct detection OFDM (DD-OFDM) optical system.

* * * * *